Figure 1:
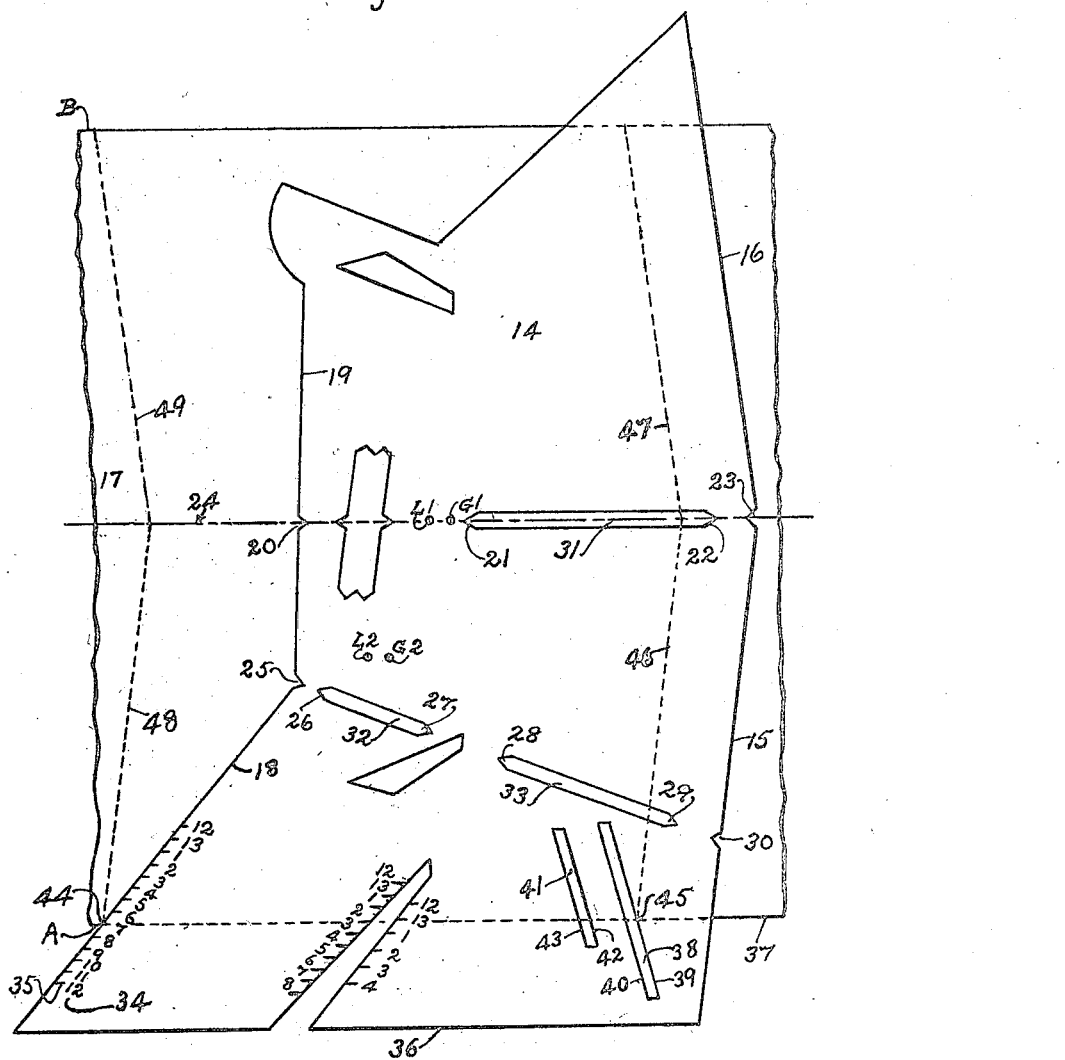

July 24, 1923.

D. HAYES 1,462,699

MEANS FOR MEASURING OR MARKING OFF THE SIZES OF HALF
SOLES OF BOOTS AND SHOES

Filed April 27, 1921

9 Sheets-Sheet 1

WITNESSES:
W. E. Doyle.
E. Mac Conville

INVENTOR
D. Hayes.
BY W. E. Doyle,
Agent.

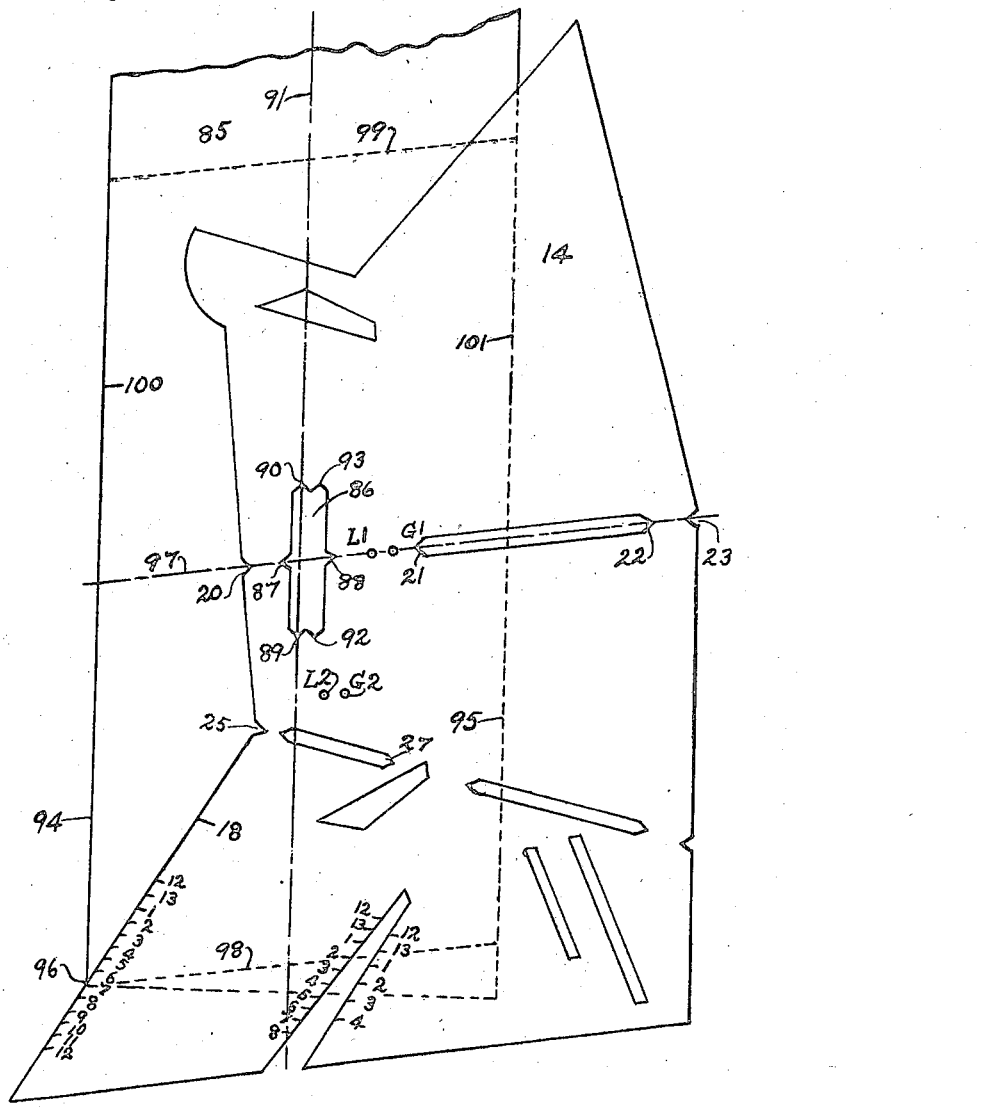

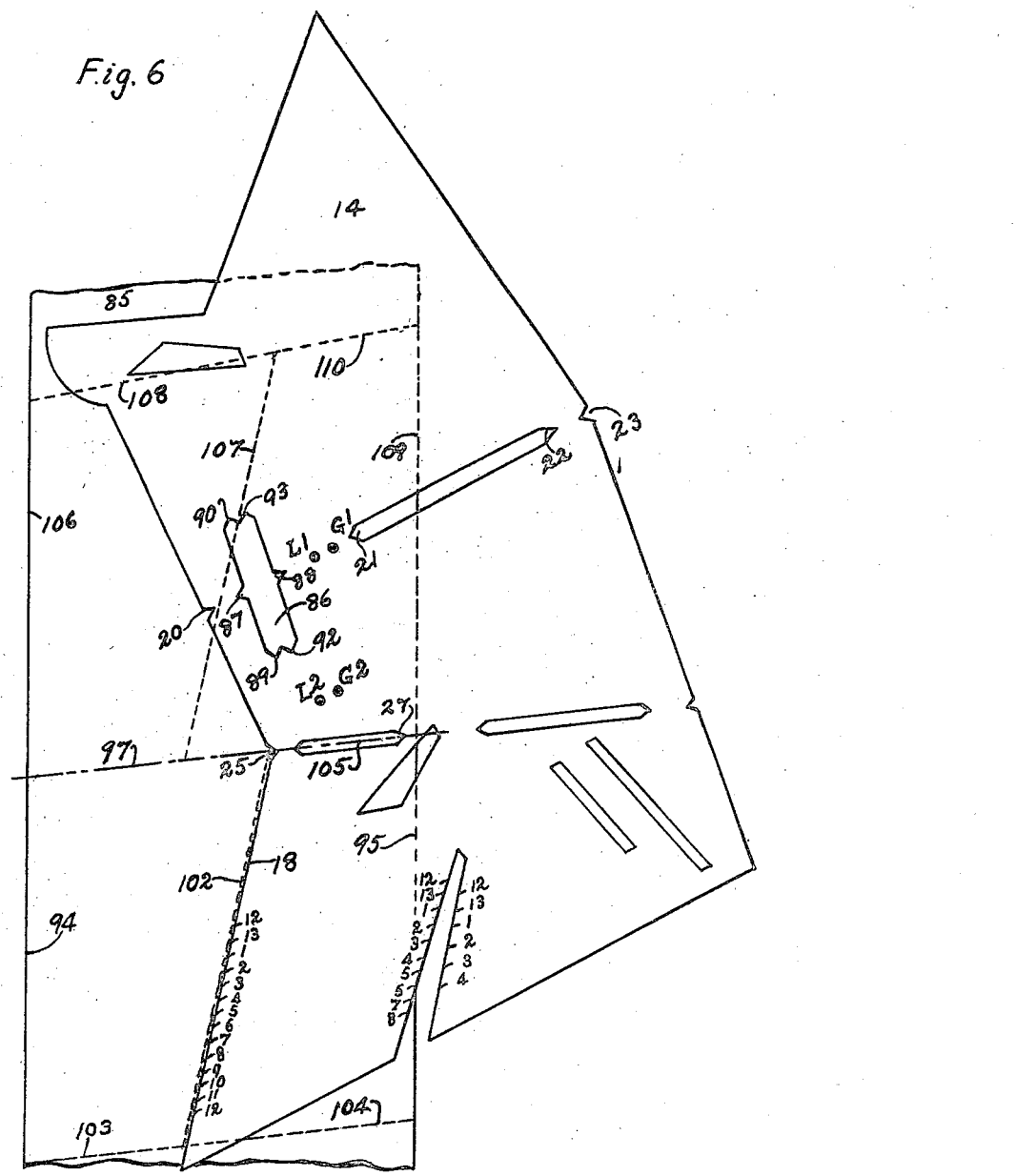

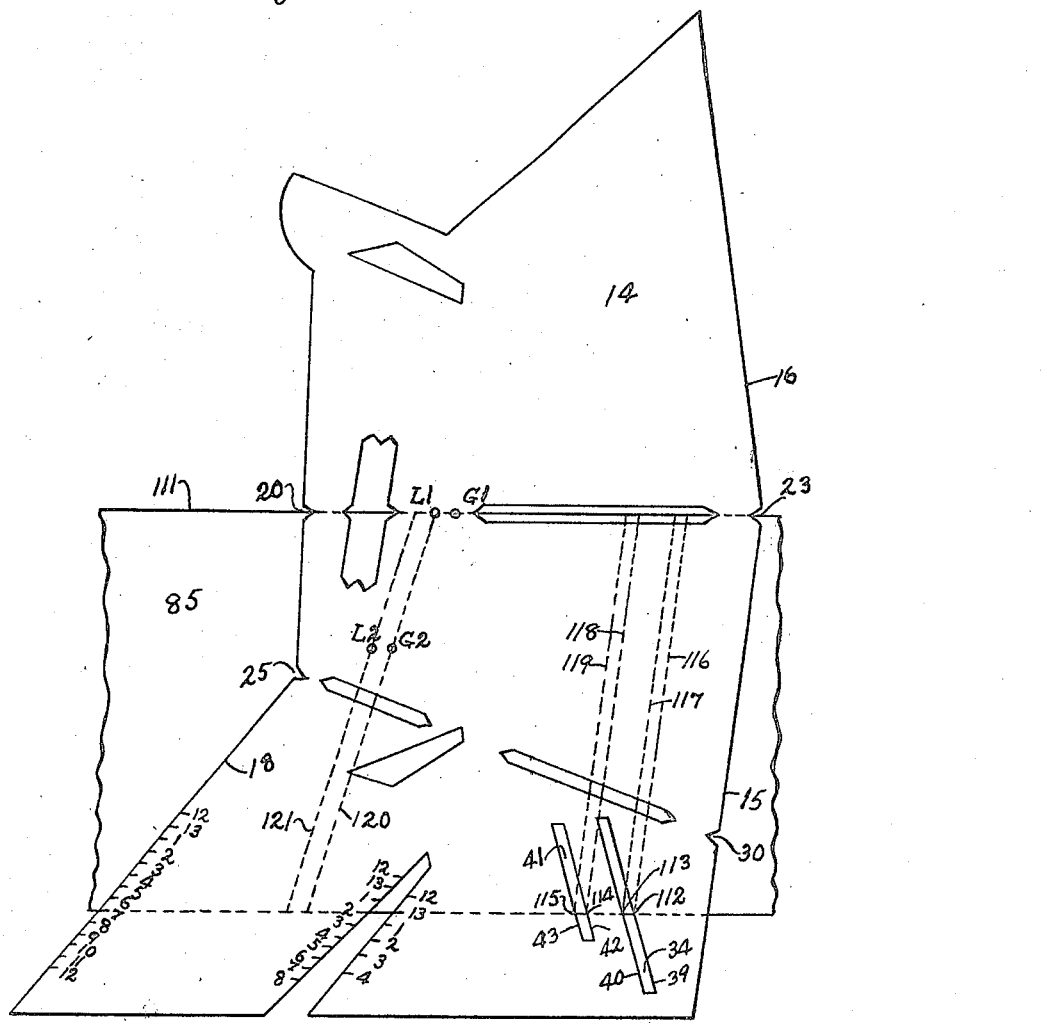

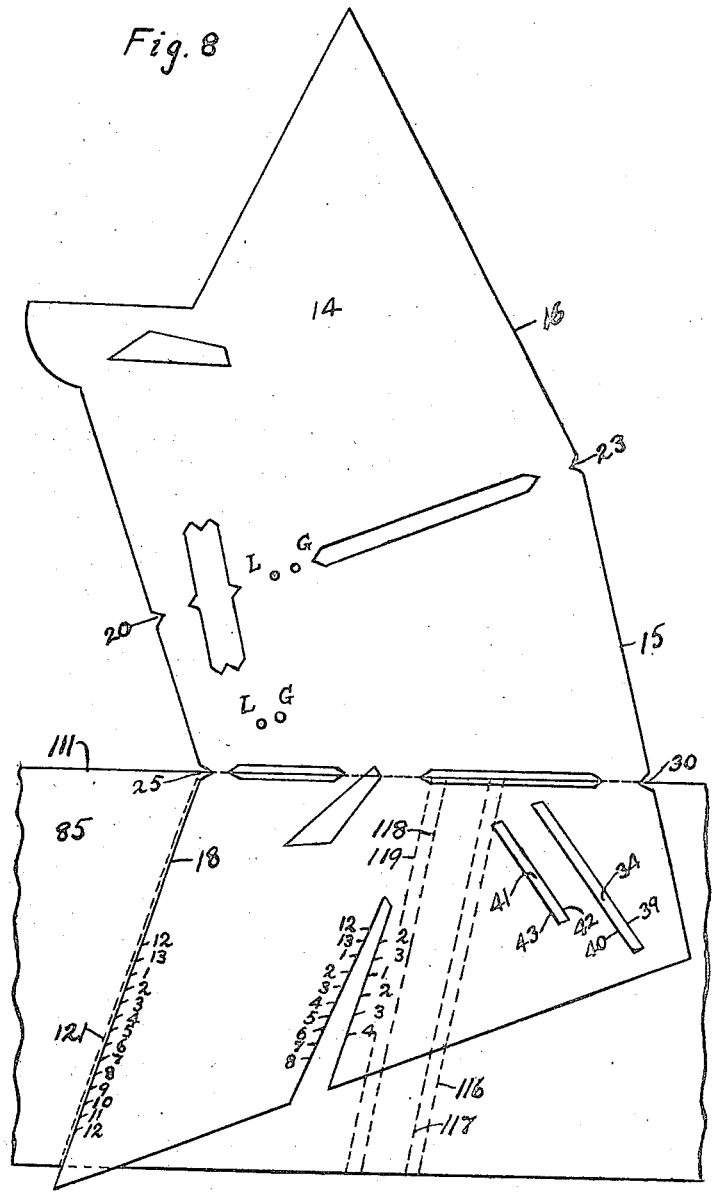

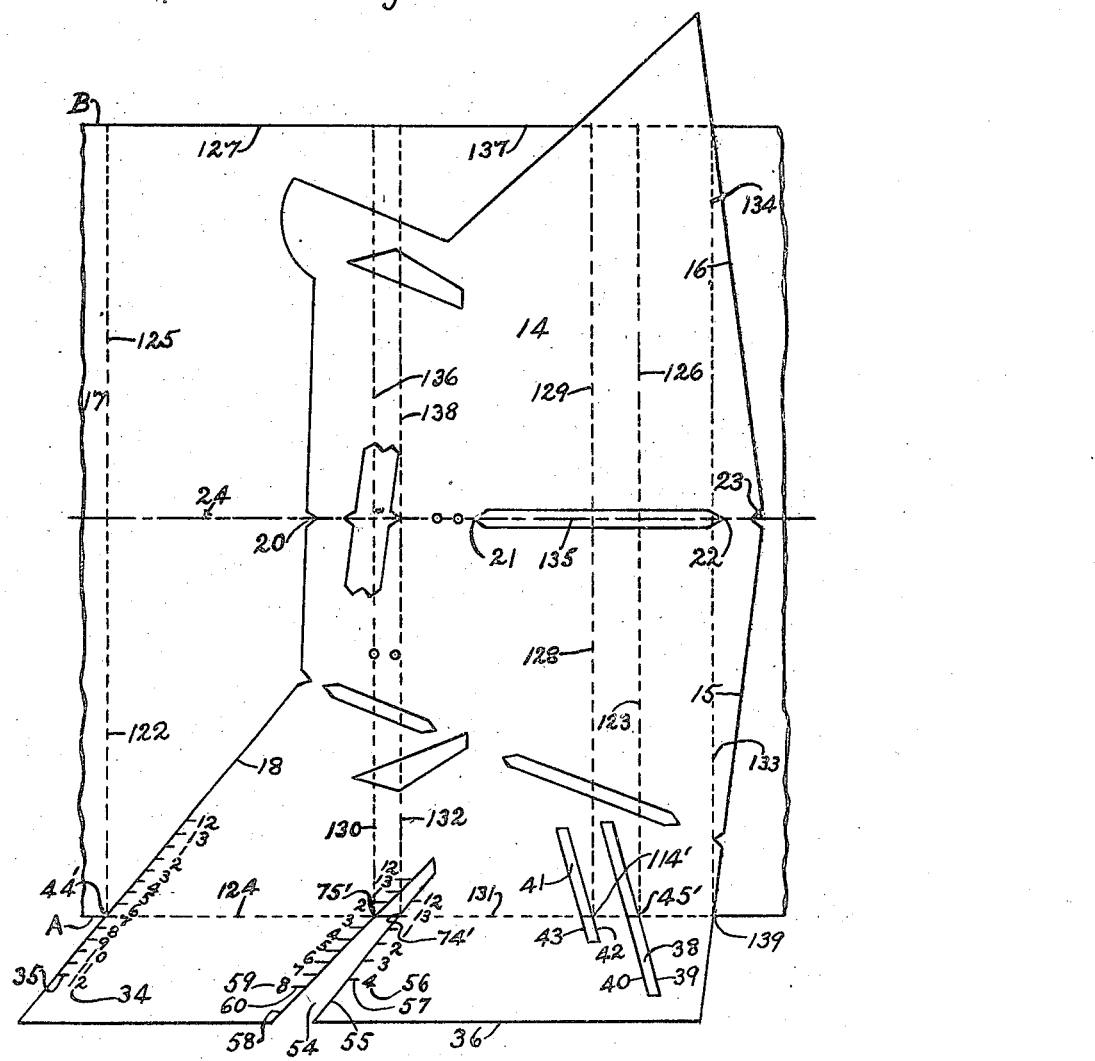

Patented July 24, 1923.

1,462,699

UNITED STATES PATENT OFFICE.

DENIS HAYES, OF LIMERICK, IRELAND.

MEANS FOR MEASURING OR MARKING OFF THE SIZES OF HALF SOLES OF BOOTS AND SHOES.

Application filed April 27, 1921. Serial No. 464,799.

*To all whom it may concern:*

Be it known that I, DENIS HAYES, a subject of the King of Great Britain, residing at 3 Newtown Mahon (Upper William Street), Limerick Co., Limerick, Ireland, have invented certain new and useful Improvements in Means for Measuring or Marking Off the Sizes of Half Soles of Boots and Shoes, of which the following is a specification.

This invention relates to means for measuring or marking off the sizes of half soles of boots and shoes and comprises further improvements in or modifications on my former inventions described in specifications Nos. 342,788; 370,681 and 385,132, including my former invention of a like nature described in my French patent specification No. 512,227.

According to my present invention, I provide a modified form of rule or marking off plate which itself is shaped and graduated and marked off in such a manner that on laying it flat on a range of leather or other material and manipulating the rule or plate, as more fully described hereinafter, the range of leather or the like may be marked off into a greater number of intermediate or full size half soles for men's and boys' and women's and girls' boots and shoes to unfinished lines or shapes as indicated by the rule or plate, these half soles being subsequently finished off to the required shape in the known manner.

My said invention is more fully described hereinafter with reference to the accompanying explanatory diagrammatic drawings in which the same reference numbers are used to indicate the same parts throughout.

In the drawings, Figs. 1 to 9 show plan views of the rule or marking off plate applied in various positions on ranges of leather or like material for the purpose of measuring or marking off the sizes of half soles of boots and shoes from said ranges.

Figure 2:
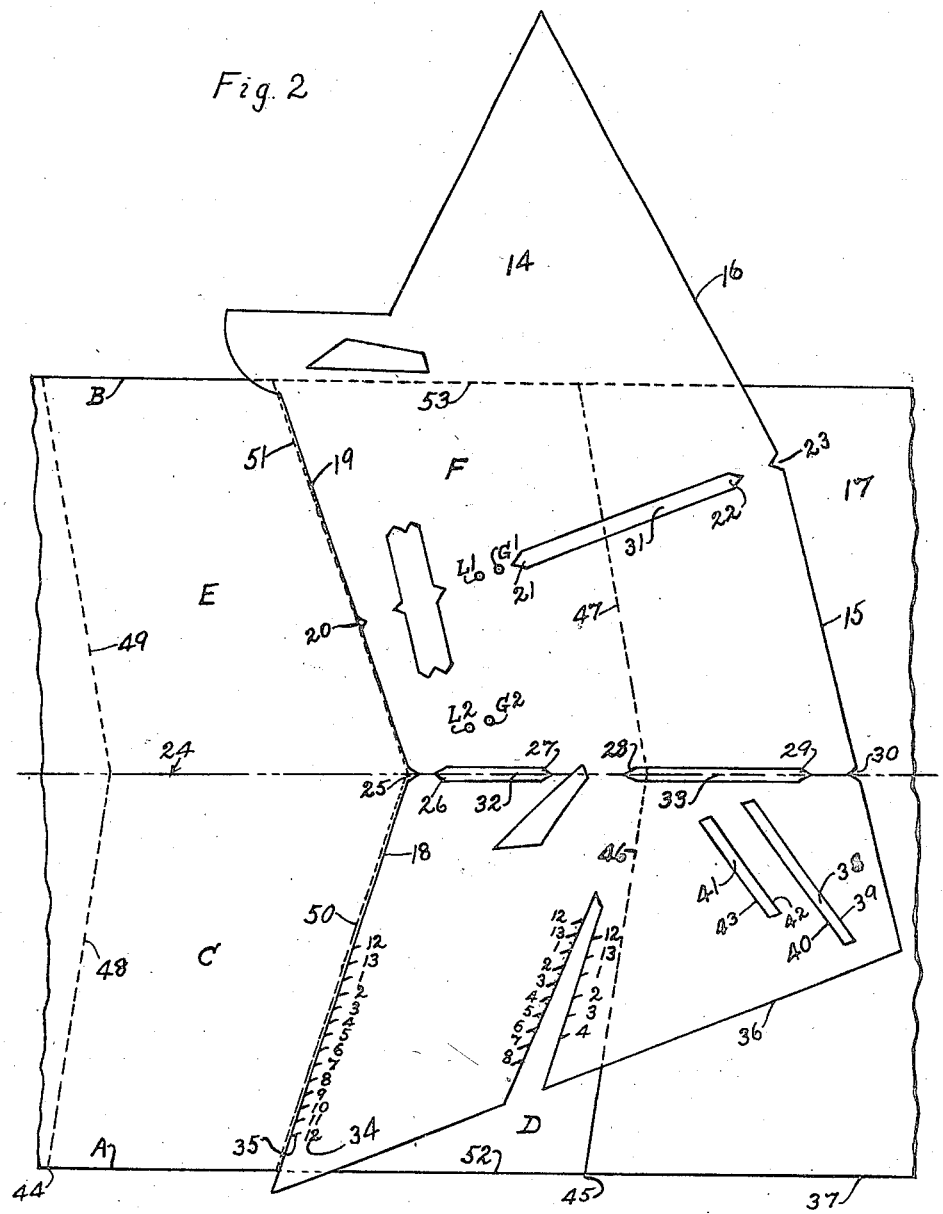
Figure 3:
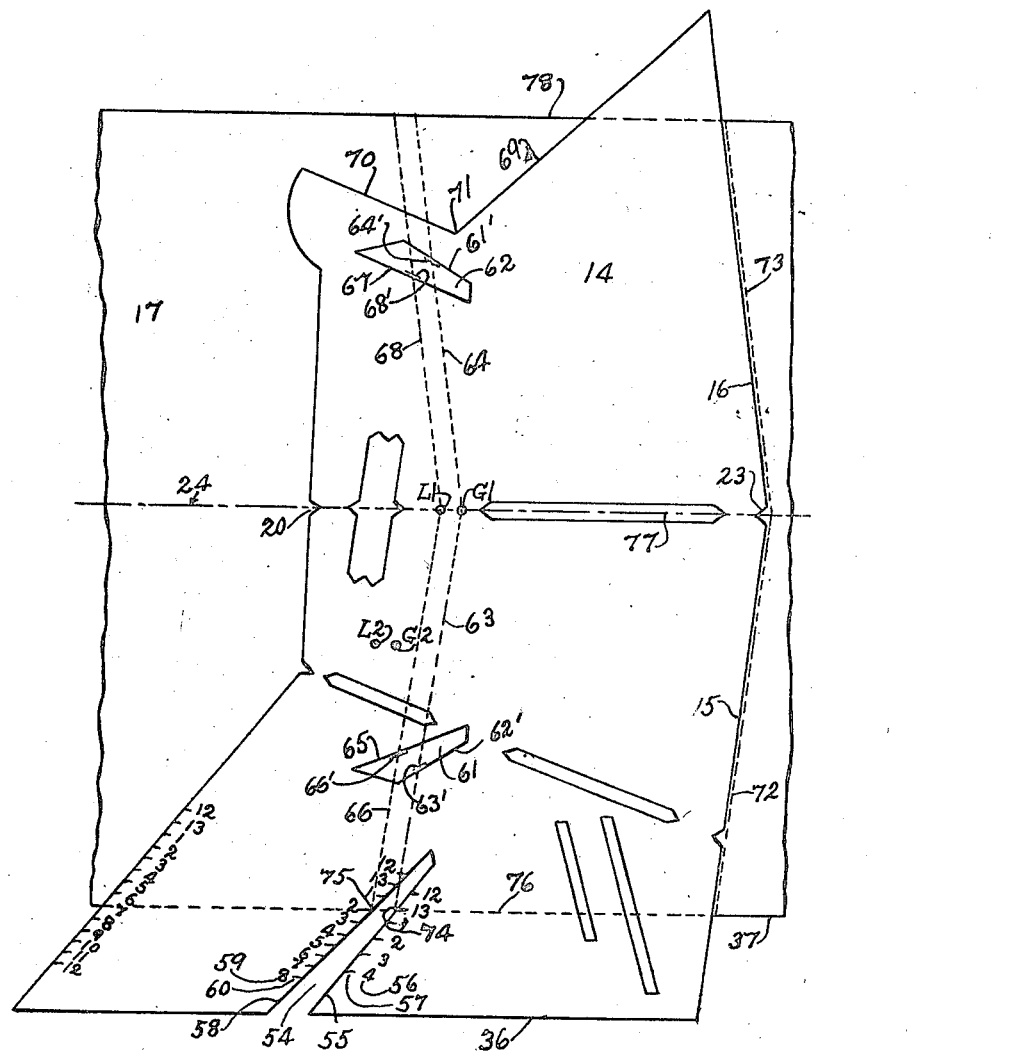

Said means for measuring or marking off the sizes of half soles of boots and shoes, consist of a rule or marking off plate 14 which is preferably made out of flat sheet metal, or may be of other suitable material, such as hard wood or fibre, and which is constructed and arranged and adapted to operate as shown in Figs. 1 to 9, as more fully set forth hereinafter. The rule or marking off plate 14 at one end is provided with edges 15 and 16 which are arranged at a predetermined angle to mark off four outer sides of a double pair of opposing half soles from a range of leather or like material such as 17. The other end of the plate 14 is provided with edges 18 and 19 which are also arranged at a predetermined angle for marking off corresponding inner and adjacent sides of said double pair of opposing half soles. In a line at right angles to the edge 19, the plate 14 has centre notches 20, 21, 22 and 23 for centering on the centre line 24 which is first marked on the centre of the range 17. The angle formed by the edges 18 and 19, is bisected by the centering notch 25 which is in line with centering notches 26, 27, 28, 29 and 30 for centering on the centre line 24 as shown in Fig. 2. The plate 14 is punched out or perforated at 31, 32 and 33. The edge 18 is numbered with sizes of men's and women's half soles as shown in the row of sizes at 34, which edge 18 is provided with marks or indents 35 to correspond to said sizes which latter may be metric or English sizes as desired. The plate 14 has an outer edge 36 which runs parallel with the edge 37 of the range 17, as shown in Figs. 1 and 3. At a predetermined angle to the edge 18, the plate 14 is provided with a parallel slot 38 which forms one edge 39 for marking off men's full size half soles, and which forms another edge 40 for marking off men's intermediate size half soles, another slot 41 being similarly arranged to form one edge 42 for marking off women's full size half soles, and another edge 43 for marking off women's intermediate size half soles, the slots 38 and 41 with their corresponding edges being also arranged in a predetermined position in relation to the edge 36. For further marking off on the range 17, the plate 14 has perforations $G^1$ and $G^2$ and $L^1$ and $L^2$, all of which are arranged in predetermined positions for further marking off of half soles on the range 17, the perforations $G^1$ and $G^2$ being for men's half soles, and the perforations $L^1$ and $L^2$ being for women's half soles. The perforations $L^1$ and $G^1$ are arranged in line with the notches 20 and 23 as shown in Fig. 1; and the perforations $G^1$, $G^2$, $L^1$ and $L^2$ are common to the slots 38 and 41 and to the edge 18 with its corresponding sizes.

With further reference to Figs. 1 and 2, I shall now proceed to show how the plate 14 is manipulated on the range for measuring and marking off therefrom a double pair of opposing half soles for gents' and ladies' boots and shoes; and for example take full size 7 in said half soles in which case the range 17 is first cut wide enough from A to B for a double pair of opposing half soles in size 7, a centre line 24 being always drawn on the range 17 for centering the plate 14 on the notches 20, 21, 22, 23, 25, 26, 27, 28, 29 and 30. The plate 14 is then first centered by means of the notches 20 and 23 on the centre line 24 with the size 7 at the point 44 coinciding with the edge 37 of the range 17, and mark the range at 44 from the edge 18, and at 45 (Fig. 1) from the edge 39. Now mark the range 17 through the perforations $G^1$ and $G^2$. With the plate 14 still centered on the line 24, move the plate 14 until its edge 15 coincides with the mark 45, and along the edges 15 and 16 draw the dotted lines 46 and 47 on the range 17. In its same centered position move the plate 14 until its edge 15 coincides with the mark 44 and along the edges 15 and 16 draw the dotted lines 48 and 49. Now manipulate the plate 14 until (as shown in Fig. 2) the notch 25 and the edge 18 coincide with the marks made on the range through the perforations $G^1$ and $G^2$ on Fig. 1, respectively, with the notches 25 and 30 on the centre line 24, and then along the edges 18 and 19 draw the dotted lines 50 and 51 (Fig. 2). The range 17 is now marked off into four men's full size half soles C, D, E and F, C being bounded by the four sides 48, 50, A and the centre line 24, and D being bounded by the four sides 50, 46, 52 and centre line 24, and E being bounded by the four sides 49, 51, B and the centre line 24, and F being bounded by the four sides 51, 47, 53 and the centre line 24. To separate the half soles C, D, E and F from the range 17, cut along their respective boundary lines aforesaid. For marking off men's intermediate size half soles, the marking off edge 40 (Fig. 1) is used instead of the edge 39 thus making D and F (Fig. 2) intermediate or narrow fitting half soles.

For marking off half soles for ladies' and girls' boots and shoes, the plate 14 is operated in a similar manner to that described for men's half soles with the exceptions that the slot 41 is used instead of the slot 38, the edge 42 being used for full size or wide fitting half soles, and the edge 43 being used for intermediate or narrow fitting half soles, while the range 17 (Fig. 1) is marked off through the perforations $L^1$ and $L^2$ which indicate ladies' and girls' half soles; and as the row of sizes at 34 is common to both men's and women's half soles, the size 7 at point 44 may also be used for size 7 in ladies' and girls' half soles so that in this case the dotted lines 48 and 49 are drawn in the same position and in the same manner.

Figure 4:
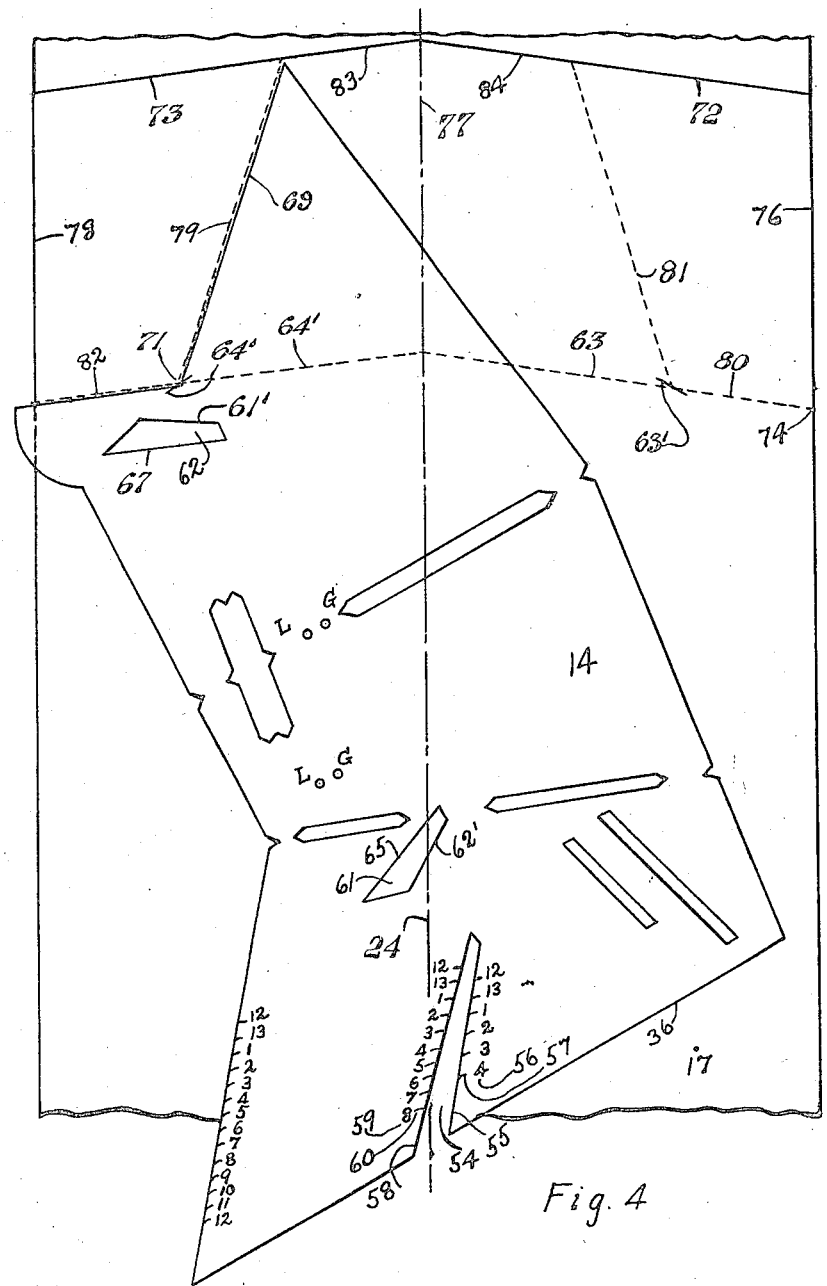

Figs. 3 and 4 show another method for measuring and marking off ladies' and girls' and boys' half soles on the range 17; and for this purpose the plate 14 is provided with a predetermined shaped and arranged slot 54 formed with an edge 55 having a predetermined row of sizes at 56 and corresponding marks 57 for measuring and marking off boys' half soles; and having an opposite edge 58 provided with a row of sizes at 59 and corresponding marks 60 for ladies' and girls' half soles. The plate 14 is further provided with slots 61 and 62 having a predetermined shape and position, the slot 61 being formed with a marking off side 62' for drawing a marking off line 63' on the dotted line 63, the slot 62 being formed with a marking off side 61' for drawing a marking off line 64' on the dotted line 64. The slot 61 is also formed with a marking off side 65 for drawing a marking off line 66' on the dotted line 66, and the slot 62 is also formed with a marking off side 67 for drawing a marking off line 68' on the dotted line 68. For subsequently marking off at the resulting angles at 63' and 64' (Fig. 4) or the resulting angles at 66' and 68' (Fig. 3) for dividing the range 17 into other halves for ladies' or girls' or boys' half soles, as more fully set forth hereinafter, the plate 14 is provided with marking off edges 69 and 70 to form a predetermined angle at 71 (Figs. 3 and 4).

With further reference to Figs. 3 and 4, the plate 14 is operated as follows for measuring and marking off boys' and ladies' and girls' half soles from size 4 to size 12 for boys and from size 8 to 12 for ladies and girls:—The range 17 is centered by the line 24, and if we select size 13 in boys' and size 2 in ladies' and girls' half soles, the range 17 is cut to the width shown on Figs. 3 and 4, that is, double the width from the sizes 13 and 2, which are arranged parallel to the edge 36, to the centre line 24. The plate 14 is now centered at 20 and 23 on the centre line 24, and from the edges 15 and 16, the dotted lines 72 and 73 (shown full in Fig. 4) are drawn on the range 17. At size 13 the range 17 is marked at 74 for boys' half soles, and at size 2 at 75 for ladies' and girls' half soles, and at the same time the marking off lines 63', 66', 64' and 68' are drawn on the range 17 from the appropriate edges of the respective slots 61 and 62 as shown in Fig. 3. In its centered position, the plate 14 is now moved until its edge 15 coincides with the mark at 74, and then the dotted lines 63 and 64 are drawn from the edges 15 and 16; and it will be observed that the dotted lines 63 and 64 are now marked off by the lines 63' and 64'. For ladies' and girls' half soles, the plate 14 in its centered position is again moved until its edge 15 coincides with the mark at 75, and then the dotted lines 66 and 68 are drawn on the range 17 from the edges 15 and 16. The range 17 is now measured and marked off in size 13, into a pair of opposing half soles, one of which is bounded by the dotted lines 63, 72, 76 and 77, the other opposing half sole being bounded by the dotted lines 64, 73, 77 and 78 (Fig. 3), or the range 17 is measured and marked off in size 2 into a pair of opposing half soles, one of which is bounded by the dotted lines 66, 72, 76 and 77, the opposite or opposing half sole being bounded by the dotted lines 68, 73, 78 and 77 for ladies' or girls' half soles in size 2 (Fig. 3). With reference to Fig. 3, we now get sufficient leather or material in size 13 within the corresponding aforesaid bounding lines for marking off a double pair of adjacent half soles (Fig. 4), in size 13, or in size 2 for ladies' and girls' half soles, we get sufficient leather or material within the corresponding bounding lines aforesaid for dividing the same into a double pair of adjacent half soles in size 2, in a similar manner as shown (Fig. 4). To complete the marking off of a double pair of adjacent half soles in size 13 (Fig. 4) the plate 14 is manipulated until its edge 70 coincides with the dotted line 64 and angle 71 touches the marking off line 64', and subsequently the dotted dividing line 79 is drawn from the edge 69. By reversing and manipulating the plate 14 until its side 70 coincides with the dotted line 80 and its angle 71 touches the marking off line 63', the dividing line 81 is drawn from the edge 69. The range is now divided into a double pair of adjacent half soles in size 13, one of which is bounded by the four sides 78, 79, 73, and 82, the other outer half sole being bounded by the four sides 76, 81, 72 and 80, the other or inner adjacent half sole is bounded by the four sides 79, 77, 64 and 83, and the other inner and adjacent half sole is bounded by the four sides 81, 77, 63 and 84. By cutting along the dotted lines 72, 73, 63 and 64 in Fig. 3, and by cutting along the dotted lines 79 and 81 in Fig. 4, the measured and marked off material is separated into four half soles in size 13. In a similar manner size 2 (Fig. 3) is marked off into a double pair of adjacent half soles from the measured and marked off pieces of material bounded by the four sides 66, 72, 76, 77 and 68, 73, 77 and 78, for ladies' and girls' half soles.

It will thus be seen that the plate 14 may be used for measuring and marking off half soles across the range as shown in Figs. 1 and 2, and lengthwise on the range as shown in Figs. 3 and 4.

With reference to Figs. 5 and 6, another method of measuring and marking off the range 85 in lengthwise manner is shown. For this purpose, the plate 14 is slotted at 86 and is provided with notches 87 and 88 which are arranged in line with the notches 20, 21, 22, and 23, for the purpose set forth hereinafter. The slot 86 is also provided in a predetermined position with centering notches 89 and 90 for centering on the centre line 91 of the range 85 for measuring and marking off ladies' half soles, and is further provided in a predetermined position with centering notches 92 and 93 for centering on the centre line 91 of the range 85 for measuring and marking off gents' half soles as more fully set forth hereinafter. If size 7 is selected in ladies' half soles, the operation is as follows for measuring and marking off this size in half soles:—The range 85 is cut wide enough from the edge 94 to the edge 95 to give the combined width of two adjacent ladies' half soles in size 7. The plate 14 (Fig. 5) is now centered on the centre line 91 by means of the centering notches 89 and 90 and is moved until size 7 at 96 touches the edge 94. The range 85 is now marked off at the notches 20 and 21, and through these points there is subsequently drawn the transverse centre line 97, and centered as shown in Fig. 5, the range 85 is marked through the hole $L^2$ for ladies' half soles, or through the $G^2$ if size 7 is selected in gents' half soles. The centre line 97 is now drawn as aforesaid; and from size 7 at 96, the dotted line 98 is drawn parallel to the centre line 97, and at the same distance the dotted line 99 is drawn parallel to the centre line 97. The range 85 is now divided into two portions, one bounded by the four lines 94, 95, 98 and 97, the other bounded by the four lines 100, 101, 99 and 97, giving in each case sufficient material for subsequently dividing into a double pair of opposed half soles as shown in Fig. 6. As shown in Fig. 6, the plate 14 is now moved and centered on the centre line 97 by means of the centering notches 25 and 27 until the edge 18 coincides with the mark on the leather made through the hole $L^2$ in Fig. 5. The dotted line 102 is now drawn on the range 85 from the edge 18, thus dividing the one portion of the leather into a pair of adjacent half soles one of which is bounded by the four lines 94, 102, 103 and 97, the other being bounded by the four lines 102, 95, 104 and 105. By reversing the plate 14 in a similar manner the other portion of the leather is divided into an opposing pair of adjacent half soles, one of which is bounded by the four lines 106, 107, 108 and 97, the other being bounded by the four lines 107, 109, 105 and 110; and by cutting along the lines 97, 105, 103, 104, 108, 110, 102 and 107, the two portions of the leather aforesaid are divided into four half soles. For measuring and marking off mens' half soles in size 7, the plate 14 is centered on the notches 92 and 93 (Fig. 5), and the range 85 is marked through the hole G², and the same operation repeated.

With reference to Figs. 7 and 8, another method is shown for marking off ladies' and gents' half soles across the range 85 which is the same width as the range shown in Figs. 5 and 6 and is therefore suitable for size 7 in ladies' and gents' half soles. In this operation the centering notches 20 and 23 are centered on the edge 111; and for mens' wide fitting or full size half soles mark the range at the point 112, or at the point 113 for mens' narrow fitting or intermediate size half soles, and then mark the range 85 through the hole G². For ladies' wide fitting or full size half soles the range is marked at 114, or at 115 for narrow fitting or intermediate size half soles, and the range is marked through the hole L² (Fig. 7). To mark off the right hand sides of these half soles, the plate 14 in its centered position (Fig. 7) is moved until its edge 15 coincides with the mark 112 or 113 or 114 or 115, and the respective dotted lines 116 or 117 or 118 or 119 may now be drawn from the edge 15 to mark off the right hand outside of each respective sole. To mark off the corresponding left hand side of each respective half sole, the plate 14 (Fig. 8) is centered by means of the notches 25 and 30 on the edge 111 of the range 85 until the edge 18 coincides with the mark made on the leather through the hole G² for gents' half soles, or with the mark made on the leather through the hole L² for ladies' half soles, and the dotted lines 120 or 121 may now be drawn on the range 85; and to divide the latter into the required size for half soles, the range 85 is cut along the dotted line 116 or 117 and 120 for gents' half soles, or is cut along the dotted line 118 or 119 and 121 with reference to Figs. 7 and 8, and thus the range 85 is divided into half soles of the required size.

The construction and arrangement and proportions and sizes of the rule or plate 14, may be varied within reasonable limits for measuring and marking off half soles for boots and shoes to unfinished outlines to suit any standard requirements, without departing from the nature or scope of the present invention which in its form shown in Figs. 1 to 9 is not drawn exactly to scale.

With reference to Fig. 9 in which the rule or marking off plate 14 is shown in the same position on range 17 as shown in Fig. 1, half soles may be measured out in different sizes and different shapes on the range of leather or other suitable material, as follows: For example, if men's full size half soles are required in full size 7, the dotted line 122 is drawn from the point 44' at size 7 and at right angles to the line A by means of an ordinary rule or set-square, line 123 is similarly drawn from the point 45' from the edge 39 which gives a pair of adjacent half soles, one of which is bounded by the dotted lines 122 and 123 and 124 and 24, the other being bounded by the lines 125 and 126 and 127 and 24. For a pair of ladies' adjacent half soles in full size 7, the dotted line 128 is drawn from the point 114' on the edge 42, thus laying out a pair of half soles, one of which is bounded by the lines 24 and 124 and 122 and 128, the other beging bounded by the lines 24 and 127 and 125 and 129. For size 2 in girls' half soles, the line 130 is drawn from the point 75' at size 2 at right angles to the edge 131; and for size 13 in boys' half soles, the line 132 is drawn from the point 74' at size 13 at right angles to the line 131, and in both cases the lines 133 and 134 are drawn on the range 17 at right angles to the edge 131 from the edge 15 of the rule or plate 14 at the point 139.

This gives a pair of opposing half soles in size 2, one of which is bounded by the lines 132 and 133 and 131 and 135, the other being bounded by the lines 136 and 134 and 135 and 137; and in size 13 one opposing half sole is bounded by the lines 132 and 133 and 131 and 135, the other being bounded by the lines 135 and 137 and 138 and 134. In all the foregoing cases, by cutting along the appropriate or respective boundary lines aforesaid, the range of leather or like material is divided into appropriate half soles aforesaid.

By the use of the rule or plate 14, economy is effected in measuring and marking off the material into half soles while a saving in time is also effected as contrasted with the former hand method of marking off half soles to unfinished outlines.

Having described my invention, I claim:—

1. Means of the kind described herein for measuring or marking off half soles of men's and women's boots and shoes to unfinished outlines, comprising a marking off plate 14 having at one end a pair of edges 15 and 16 arranged at a predetermined angle to each other and adapted for marking off on a range of material four outer sides 46, 47, 48 and 49 of a double pair of opposing half soles, forming the opposite end of said plate with a pair of edges 18 and 19 also arranged at a predetermined angle and adapted for marking off corresponding inner and adjacent sides 50 and 51 of said double pair of opposing half soles, in a line at right angles to the edge 19 aforesaid, notches 20, 21, 22 and 23 formed in said plate and adapted for centering it on a centre line 24 on said range in marking off position, on a line bisecting the apex of edges 18 and 19 a centering notch 25 in line with centering notches 26, 27, 28, 29 and 30 formed in said plate and adapted for centering it on centre line 24 in marking off position, on said edge 18 marked numbers corresponding to sizes of men's and women's half soles.

2. Means of the kind described herein for measuring or marking off half soles of men's and women's boots and shoes to unfinished outlines, comprising a marking off plate 14 having an outer edge 36 arranged parallel to an edge 37 on a range of material to be marked off, at a predetermined angle to an edge 18 on said plate a parallel slot 38 having one edge 39 adapted for marking off men's full size half soles on said range, and having another edge 40 for marking off men's intermediate size half soles on said range, a slot 41 similarly arranged in said plate and having one edge 42 for marking off women's full size half soles on said range, and having another edge 43 for marking off women's intermediate size half soles on said range, in predetermined positions, in said plate perforations $G^1$ and $G^2$ for men's half soles and perforations $L^1$ and $L^2$ for women's half soles all adapted for further marking off through said perforations half soles on said range of material.

3. Means of the kind described herein for measuring or marking off half soles of men's and women's boots and shoes to unfinished outlines, comprising a marking off plate 14 having at one end a pair of edges 15 and 16 arranged at a predetermined angle to each other and adapted for marking off on a range of material at predetermined positions thereon sides 72 and 73 of a double pair of adjacent half soles with said plate centered at 20 and 23 on said range, in said plate a predetermined shaped and arranged slot 54 having a marking off edge 55 with rows of sizes corresponding to boys' half soles, and having an opposite edge 58 impressed with marking off sizes corresponding to girls' half soles, in said plate marking off slots 61 and 62 having a predetermined shape and position, the slot 61 having a marking off side 62′ adapted for marking off a line 63′ on a dotted line 63 drawn from said edge 15, the slot 62 having a marking off side 61′ adapted for marking off a line 64′ on a dotted line 64 drawn from said edge 16, said dotted lines 63 and 64 being the other sides of a double pair of adjacent boys' half soles.

4. Means of the kind described herein for measuring or marking off sizes of half soles of men's and women's boots and shoes to unfinished outlines, comprising a marking off plate 14, in said plate marking off slots 61 and 62 having a predetermined shape and position and having marking off sides 65 and 67 adapted for marking off lines 66′ and 68′ on dotted lines 66 and 68 drawn from edges 15 and 16 on said plate, said dotted lines 66 and 68 being sides of a double pair of adjacent girls' half soles, on said plate marking off edges 69 and 70 adapted to form a predetermined angle 71, the edge 70 being adapted to coincide with a dotted line 64 and with said angle 71, or on reversal, with a dotted line 63 and with the corresponding mark thereon, so that the dotted line 79 may be drawn on said range, or on reversal of said plate, the dotted line 81 may be similarly drawn, said dotted lines 79 and 81 and a central line 77 forming division lines between double pairs of adjacent half soles.

5. Means of the kind described herein for measuring or marking off sizes of half soles of men's and women's boots and shoes to unfinished outlines, comprising a marking off plate 14, in predetermined position in said plate a slot 86 having centering notches 87 and 88 arranged in line with centering notches 20, 21, 22 and 23 in said plate.

6. Means of the kind described herein for measuring or marking off sizes of half soles of men's and women's boots and shoes to unfinished outlines, comprising a marking off plate 14 having in predetermined position therein a slot 86 provided in predetermined positions with centering notches 89 and 90 adapted for centering on a line 91 on a range of material for measuring and marking off ladies' half soles, said slot 86 being also provided with centering notches 92 and 93 adapted for centering on said centre line 91 for measuring and marking off gents' half soles, in the plate 14, a marking off hole $L^2$ for ladies' half soles and a marking off hole $G^2$ for gents' half soles, in the plate 14 centering notches 25 and 27 adapted for centering on a centre line 97 on said range.

Signed by me this 12th day of April 1921.

DENIS HAYES.

Witnesses:
J. A. DINAN,
ELSIE COLLINS.